United States Patent

[11] 3,616,193

| [72] | Inventors | Hyman R. Lubowitz<br>Redondo Beach;<br>Eugene A. Burns, Palos Verdes Estate, both of Calif. |
|---|---|---|
| [21] | Appl. No. | 728,885 |
| [22] | Filed | May 14, 1968 |
| [45] | Patented | Oct. 26, 1971 |
| [73] | Assignee | TRW Inc.<br>Redondo Beach, Calif.<br>Continuation-in-part of application Ser. No. 531,026, Mar. 2, 1966, now Patent No. 3,431,235. |

[54] THERMOSET POLYDIENE RESIN ADHESIVE BONDED LAMINATES AND METHODS OF MAKING SAME
20 Claims, No Drawings

[52] U.S. Cl. .................................................. 161/190,
156/331, 161/217, 161/219, 260/66, 260/75,
260/78, 260/836, 260/837, 260/858, 260/887

[51] Int. Cl. ........................................................ B32b 27/40,
C08g 33/10, C08g 30/00

[50] Field of Search ............................................. 161/217,
219, 190, 182; 156/331; 260/2 EP, 2 EN, 47 CZ,
47 EF, 47 EN, 77.5 CR, 78 U, 75, 75 A, 66, 836,
837, 858, 859, 887

[56] References Cited
UNITED STATES PATENTS

| 3,055,952 | 9/1962 | Goldberg.................. | 260/635 |
|---|---|---|---|
| 3,084,141 | 4/1963 | Kraus et al................. | 260/85.1 |
| 3,218,215 | 11/1965 | Achterhof et al............ | 161/219 X |
| 3,231,540 | 1/1966 | Vanderbilt.................. | 161/193 X |
| 3,239,403 | 3/1966 | Williams et al.............. | 156/275 |
| 3,352,742 | 11/1967 | Zunich et al................ | 161/125 |
| 3,415,715 | 12/1968 | Gorcom ...................... | 161/190 |
| 3,431,235 | 3/1969 | Lubowitz..................... | 161/190 X |
| 3,448,171 | 6/1969 | Damusis....................... | 260/859 |
| 3,462,516 | 8/1969 | Smith et al.................. | 260/887 |
| 3,467,611 | 9/1969 | Wolinski ..................... | 260/836 |
| 3,468,972 | 9/1969 | Hsieh .......................... | 260/836 |
| 3,468,976 | 9/1969 | Yanai et al................... | 260/883 |
| 3,472,807 | 10/1969 | Isaacs......................... | 260/859 X |
| 3,475,353 | 10/1969 | Farber......................... | 260/2 |
| 3,484,411 | 12/1969 | Matzner ....................... | 260/75 |
| 3,515,772 | 6/1970 | Lubowitz et al. ............. | 260/836 |

FOREIGN PATENTS

| 1,315,354 | 12/1962 | France .......................... | |

OTHER REFERENCES

" Product Data Bulletin No. 505," published by Sinclair Petrochemicals, Inc., issued May 1, 1965 (46 pages)

*Primary Examiner*—Harold Ansher
*Attorneys*—Daniel T. Anderson, Alan D. Akers and James V. Tura

---

ABSTRACT: This invention relates to polydiene resin coatings, adhesives, and laminates, and the methods of producing the same. In particular a polydiene resin, such as dihydroxyl terminated 1,2-polybutadiene, is mixed with an organic chain extender, such as 2,4-toluene diisocyanate, in the presence of a peroxide free radical initiator, such as dicumyl peroxide, to form a liquid polymeric mixture. The liquid polymeric mixture is dissolved in a carrier solvent to facilitate application on a surface to be coated or bonded. After removal of the carrier solvent, the liquid polymeric mixture is exposed to ambient or slightly elevated temperatures whereby an elastomeric coating or bond is formed. At a subsequent period of time, the elastomeric material is exposed to elevated temperatures whereupon the elastomer is cured to a hard resinous coating or bond.

3,616,193

THERMOSET POLYDIENE RESIN ADHESIVE BONDED LAMINATES AND METHODS OF MAKING SAME

This is a continuation-in-part of application Ser. No. 531,026, filed Mar. 2, 1966, now U.S. Pat. No. 3,431,235.

For many applications, it is desirable to provide thermosetting plastics which have a high hydrocarbon content in addition to thermal stability, high strength modulus (stiffness), and workability in the precured state. The high hydrocarbon content contributes to humidity resistance which is important in the case, for example, of machine elements such as gears which must retain their dimensional stability in humid environments. In addition, the thermosetting plastic of the present invention has been used successfully as a matrix for glass reinforced laminates having improved thermal and chemical stability and humidity resistance.

The most common thermosetting resins such as the phenolics, polyesters, epoxides and urethanes normally contain only about 80 to 85% by weight of hydrocarbons and in addition other constituents which tend to made the resins hydrophilic and reduce their resistance to conditions of high humidity. On the other hand, the resins composed completely of hydrocarbons, such as polyethylene, polystyrene, polypropylene, and polystyrene-butadiene copolymers, are thermoplastic. Chemical cross-linking of these thermoplastic materials to provide thermosetting molecules, even under extreme conditions, does not yield high modulus plastics. Some of the newer resins such as the polyphenylenes, although "stiff" without cross-linking, are extremely difficult to process.

One of the objects of the present invention is to provide a series of thermosetting resins which have a high hydrocarbon content and are resistant to humidity.

Another object of the invention is to provide a predominantly hydrocarbon resin having high strength modulus.

It is another object of the invention to provide a thermosetting polydiene resin characterized mainly by a fused alicyclic structure.

It is a still further object of the invention to provide a thermosetting resin having a rubbery precursor which is formable by casting process techniques.

A still further object of the invention is to provide a novel process for producing a thermosetting resin of a cyclized polydiene urethane structure which process does not require severe reaction conditions.

Another object of the present invention is to provide compositions which are suitable for use as laminating materials and as adhesives.

Another object is to provide thermosetting resins of high thermal stability.

A further object is to provide lightweight thermosetting resins.

Another object is to provide resins which are chemically stable, particularly against oxidation.

It is a still further object of the invention to provide a coating composition which may be applied in a liquid form to a substrate, which composition upon curing forms an exceedingly tough, chemically and thermically stable resin film.

The thermosetting cyclized polydiene resin of the invention is comprised of mainly cross-linked, linearly-extended chains of fused substituted or unsubstituted cyclohexane groups. These fused substituted or unsubstituted cyclohexane groups are interconnected by chain extending chemical groups. The thermosetting polydiene resin is produced by a process involving reacting a chemically polyfunctional substituted polydiene prepolymer, characterized by an elongated carbon chain having pendant vinyl groups on alternate carbon atoms of the chain, with a polyfunctional organic chain extender which is capable of reacting with the functional groups of the polydiene to increase markedly the molecular weight through extension of the chain length. Cyclizing of the pendant vinyl groups into fused cycloaliphatic groups and cross-linking of adjacent chains are promoted by a peroxide free radical initiator. The hydrocarbon content of the resins is at least 90%, generally in excess of 93%, and typically on the order of 96%.

Preferably, the functional substituted groups of the polydiene prepolymer are positioned at the terminal ends of the prepolymer. While difunctional materials characterized by terminal substitution are preferred, other polyfunctional prepolymers having, for example, one terminal group and a second group located away from the other end of the prepolymer may be employed. The preferred polydienic prepolymer is a 1,2-polybutadienedial having hydroxyl substituents positioned at the terminal ends of the prepolymer. The prepolymer desirably has a molecular weight from about 500 to 3,000. The polydiene prepolymer may be a 3,4-polyisoprene material such as 3,4-polyisoprenediol. The polyfunctional substituted polydiene prepolymer is preferably a dihydroxy material but may be, for example, a dicarboxyl substituted compound, a diamine substituted compound, or other polydienic prepolymer having chemically functional groups preferably terminally positioned.

The 1,2-isomeric form of the polybutadienediol may be prepared by anionic polymerization of conventional 1,3-butadiene. In a typical reaction system, an alkali metal, e.g., lithium or sodium, is dispersed with the butadiene in a polar solvent such as tetrahydrofuran. The butadiene undergoes a 1,2 polymerization to produce a polyaliphatic hydrocarbon terminated by the alkali metals. The resulting polymer is characterized mainly by an elongated carbon chain having pendant vinyl groups on alternate carbon atoms of the chain. The polymer is then reacted with ethylene oxide, or other suitable organic oxides, and subsequently acidified to provide the 1,2-polybutadienediol prepolymer. Alternatively, the polymer may be reacted with oxygen and subsequently acidified to provide the 1,2-polybutadienediol prepolymer. The prepolymer is isolated by evaporation of the solvent. However, for many purposes, it may not be necessary to remove the solvent at this stage. The polymerization reaction is carried out in an atmosphere free of oxygen or water vapor employing temperatures in the range of $-80°$ C. to about $-20°$ C. The addition of ethylene oxide is carried out at temperatures on the order of about $-50°$ C.

The 1,2-isomeric form of the polybutadiene dicarboxylic acid prepolymer may also be prepared by anionic polymerization of conventional 1,3-butadiene. In a typical reaction system, an alkali metal, e.g., lithium or sodium, is dispersed with the butadiene in a polar solvent such as tetrahydrofuran. The butadiene undergoes a 1,2 polymerization to produce a polyaliphatic hydrocarbon terminated by the alkali metals. The resulting polymer is characterized mainly by an elongated carbon chain having pendant vinyl groups on alternate carbon atoms of the chain. The polymer is then reacted with carbon dioxide and subsequently acidified to provide the 1,2-polybutadiene dicarboxylic acid prepolymer.

The polydiene prepolymer used in the production of the thermosetting resin of the invention should be predominantly of the 1,2 configuration and desirably has at least 80% of the polymer structure with a 1,2 configuration. A polydiene starting material made up predominantly of a polymer resulting from a 1,4 polymerization is not satisfactory for use in the method of the invention. Preferably, the polymer microstructure comprises at least 90% of the 1,2 configuration. A polydiene prepolymer containing an excessive amount of the 1,4 polymer configuration will give a thermosetting resin which does not have the desirable physical and chemical properties of resins of this invention. Generally the polydiene prepolymers suitable for the purposes of this invention do not dry or harden oxidatively in air at room or moderately elevated temperatures.

The polydiene prepolymer is reacted with the polyfunctional organic chain extender and a peroxide initiator, after thorough mixing, desirably followed by degassing. In the instance of a dihydroxy polydiene prepolymer and diisocyanate chain extender, the chain extending reaction proceeds at room temperature or moderately elevated temperatures to produce a rubber intermediate compound characterized in having the peroxide free radical initiator molecularly dispersed throughout. Heating of the rubber intermediary to temperatures of about 70° C. to 140° C. promotes cyclizing of the vinyl groups of the prepolymer chains to form condensed (substituted or unsubstituted) cyclohexane rings and cross-linking of adjacent chains. It will be appreciated that the diisocyanate markedly increases the molecular weight of the prepolymer through formation of polyurethane bonds.

The conditions set forth in the preceding paragraph are typical for the process of the invention employing a dihydroxypolydiene prepolymer and a diisocyanate chain extender. It will be appreciated that the conditions will vary with the materials used for production of the thermosetting polydiene resin and that these conditions may be readily determined by one skilled in the art. In the foregoing example employing a diisocyanate and a dihydroxy polydiene prepolymer, the first chain extending reaction occurs at room temperature and is followed by the second cyclizing and cross-linking reaction occurring at a somewhat higher temperature. Rapid heating of the reactants to elevated temperatures may cause the two reactions to occur substantially simultaneously. For the purposes of this invention the stepwise cure is preferred.

The organic chain extender is normally a difunctional material but may contain more than two functional groups. The preferred polyfunctional organic chain extender when used with a dihydroxy polydiene prepolymer such as 1,2-polybutadienediol is an organic diisocyanate material which in the process of the invention reacts at a moderately low temperature to form polyurethane bonds to increase markedly the molecular weight of the prepolymer. Typical diisocyanate compounds which may be used in the process of the invention include:

TABLE I 2,4-toluene diisocyanate
Hesamethylene diisocyanate
2,6-toluene diisocyanate
Dianisidine diisocyanate
1,4-benzene diisocyanate
p,p'-diisocyanate diphenyl methane
1-chlorophenyl-2,4-diisocyanate
Trimethylene diisocyanate
Pentamethylene diisocyanate
Butylene-1,2-diisocyante
Butylene-1,4-diisocyanate
Xylene diisocyanate
2,4- cyclohexylene diisocyanate
1,1-dibutyl ether diisocyanate
1,6-cyclopentane diisocyanate
2,5-indene diisocyanate
Diphenylmethane diisocyanate
1,5-naphthalene diisocyanate
Triphenylmethane diisocyanate The urethane bond formed in the chain extension of dihydroxy polydiene prepolymers employing diisocyanates is desirable in that there is no formation of a condensation product such as water or ammonia. The absence of a volatile condensation product makes the reaction particularly useful in the formation of an adhesive bond, laminates and compact resin masses. Additionally, the diisocyanate-dihydroxy polydiene prepolymer mixture is castable and upon reaction which occurs at a moderately low temperature, produces a long shelflife, tack-free, rubbery material. The urethane rubber resulting from the diisocyanate reaction has a peroxide free radical initiator molecularly dispersed throughout, which initiator is required for the cyclizing and cross-linking reaction to produce the hard thermosetting resin.

There are other possible combinations of chain extension compounds polydiene prepolymer which can produce resins equivalent to those obtained from the diisocyanates-dihydroxy polydiene prepolymer combinations. For instance, reaction of the dihydroxy polydiene prepolymer with dicarboxylic acids, diacid halides, diesters, anhydrides and dianhydrides will produce a resin capable of cyclization that has been chain extended through polyester groups. The use of dicarboxylic acids, diacid halides, and diesters for chain extension results in the formation of chemical byproducts which may be volatile, thereby making these particular combinations less desirable for many applications. Dianhydrides are preferable because chain extension is effected without formation of chemical byproducts.

Other possible combinations of reactants can produce cyclized, cross-linked polydiene resins in addition to those utilizing the dihydroxy polydiene prepolymers. For example, polydiene dicarboxylic acid prepolymers having pendant vinyl groups on alternate carbon atoms on the backbone can be chain extended with a variety of compounds such as diols, diamines, diisocyanates, diepoxides, diimines and diimides. Polydiene dicarboxylic acids chain extended with diepoxides, diimines and diimides are preferred for the purposes of this invention because chemical by products are not formed in the reaction. Typical polydiene dicarboxylic acids include the 1,2-polybutadiene dicarboxylic acid and the 3,4-polyisoprene dicarboxylic acid structures. It will be appreciated that other derivatives of the dicarboxylic acid polydienes, can be used such as diacid halides, polyanhydrides, and diesters and suitable chain extenders will yield equivalent chain extended thermosetting polydiene resins.

Analogous useful resins which can produce cyclized polydiene polymers can be prepared from polyfunctional polydiene amines. For example, compounds which consist of 1,2-polybutadiene or 3,4-polyisoprene structures that have terminal amine groups may be chain extended by a number of difunctional and polyfunctional chain extenders. Typical diamine chain extenders that provide products that are useful for the purposes of this invention are diisocyanates, anhydrides, dianhydrides, dicarboxylic acids, diacid chlorides, diesters and diepoxides. It will be appreciated that the chain extenders such as diisocyanates, dianhydrides and diepoxides which produce no secondary product are preferable for the purposes of this invention.

Among the acids and anhydride chain extenders that may be employed are:

TABLE II

1. Adipic acid
2. Fumaric acid
3. 1,4-cyclohexanedicarbocylic acid
4. terephthalic acid
5. malonic acid
6. 7. Acid (Emery 3162–D)
7. Dimer Acid (Empol 102 2and 1018) Empol Dimer Acids
8. Axelaix acid
9. sebacic acid
10. isophthalic acid
11. endo-cis bicyclo (2.2.1) -5-heptene-2,3-dicarboxylic dianhydride
12. succinic anhydride
13. dodecenyl succinic anhydride
14. tetrahydrophthalic anhydride
15. hexahydrophtalic anhydride
16. maleic anhydride
17. phthalic anhydride
18. glutaric anhydride
19. 1,4,5,6,7,7-hexachlorobicyclo -[2.2.] -5-heptene -23-dicarboxylic anhydride
20. tetrachlorophthalic anhydride Suitable dianhydrides and polyanhydride chain extenders include the following:

TABLE III 1. 3,3' 4,5' -benzophenone tetracarboxylic dianhydride
3. pyromellitic dianhydride
4. pyromellitic dianhydride-glycol adducts.
5. 1,2,3,4-cyclopentanetetracarboxylic dianhydride Suitable diepoxide chain extenders include the following:

TABLE IV

1. Epoxy novalacs
2. Bis-epoxydicyclopentyl ether of ethylene glycol
3. epichlorohydrin/bis phenol A-type
4. 1-Epoxyethyl-3,4-epoxycyclohexane
5. dicyclopentadiene dioxide
6. limonene dioxide
7. bis(2,3-epoxypropoxy)benzene 8. vinylcyclohexane dioxide
9. 3,4-epoxy-6-methylcyclohexylmethyl-3,4-epoxy-6-methylcyclohexanecarboxylate
10. zeaxanthin diepoxide
11. 9,10-epoxy-12-hydroxyoctadecanoic acid, triester with glycerol.

Suitable diimine, diimide and triimide chain extenders include the following:

TABLE V 1. 1,6-hexane, N,N' diethylenimine
2. 1,6-hexane, N,N'dipropylenimine
3. 1,7-heptane, N N' diethylenime
4. 1,7-heptane, N,N' dipropylenimine
5. 1,8-octane, N, N'diethylenimine
6. 1,8-octane, N, N'dipropylenimine
7. 1, -di(carboxy-N-propylenimide) benzene
8. 1,5-tri(carboxy-N-propylenimide)
9. 1,3-di(ethylene-N-1,2-butylimine) benzene In some applications, a catalyst may be supplied to accelerate the chain extension reaction. For example, in the formation of the urethane bond between the diisocyanate and the dihydroxypolydiene prepolymer it is sometimes desirable to provide a catalyst which promotes polyurethanation. Suitable catalysts to promote the formation of the chain extending bonds through the reactions of other compounds are well known in the art. Similarly, the conditions generally favoring the reactions involving other combinations of reactants are known. For example, the chain extension reaction occurring between a dicarboxylpolydiene prepolymer and a diimine organic chain extender will be usually carried out in the range of 20° to 90° C. and that of a dicarboxylpolydiene prepolymer and a diepoxide chain extender generally in the range of 50° to 120° C. Where the 1,2-polybutadiene or 3,4-polyisoprene structure carries terminal amine groups the reaction with a diisocyanate to form a polyurea chain extending linkage is carried out generally in the range of 0° to 50° C. In the instance where the 1,2-polybutadienediol or 3,4-polyisoprenediol is chain extended through an ester linkage through reaction with a dibasic acid, the reaction is typically carried out in the range of 80° to 135° C. A dianhydride chain extension with a dihydroxypolydiene prepolymer will proceed in temperature range approximately 20° to 30° C. lower than that of the dibasic acid reaction. A chain extension employing a diacid chloride reacting with a dihydroxypolydiene prepolymer will proceeds in the general range of 40° to 100° C. It will be appreciated that the presence or absence of a catalyst will have bearing upon the reaction conditions. The foregoing temperature ranges are provided to give only an indication of general conditions and are not intended to be limiting.

Organic or inorganic peroxide free radical initiators may be employed in the process of the invention. Typical organic peroxides which initiate cyclization of pendant vinyl groups of the prepolymer are listed in Table VI:

TABLE VI 1. di-t-butyl peroxide
2. 2,5-dimethyl-2,5-bis(tertiary (tertiary butylperoxy) hexane
3. n-butyl-4,4-bis(tertiary butylperoxy) valerate
4. 2,5-dimethyl-2,5-bis(tertiary butylperoxy) hexyne-3
5. tertiary-butyl perbenzoate
6. dicumyl peroxide
7. methyl ethyl ketone peroxide
8. cumene hydroperoxide
9. di-N-methyl-t-butyl percarbamate
10. Lauroyl peroxide
11. acetyl peroxide
12. 12.decanoyl peroxide
13. t-butyl peracetate
14. t-butyl peroxyisobutyrate The overall reaction system for the preparation of the improved resins from a 1,2-polybutadienediol and 2,4-toluene diisocyanate is represented ideally by the following sequence of reactions:

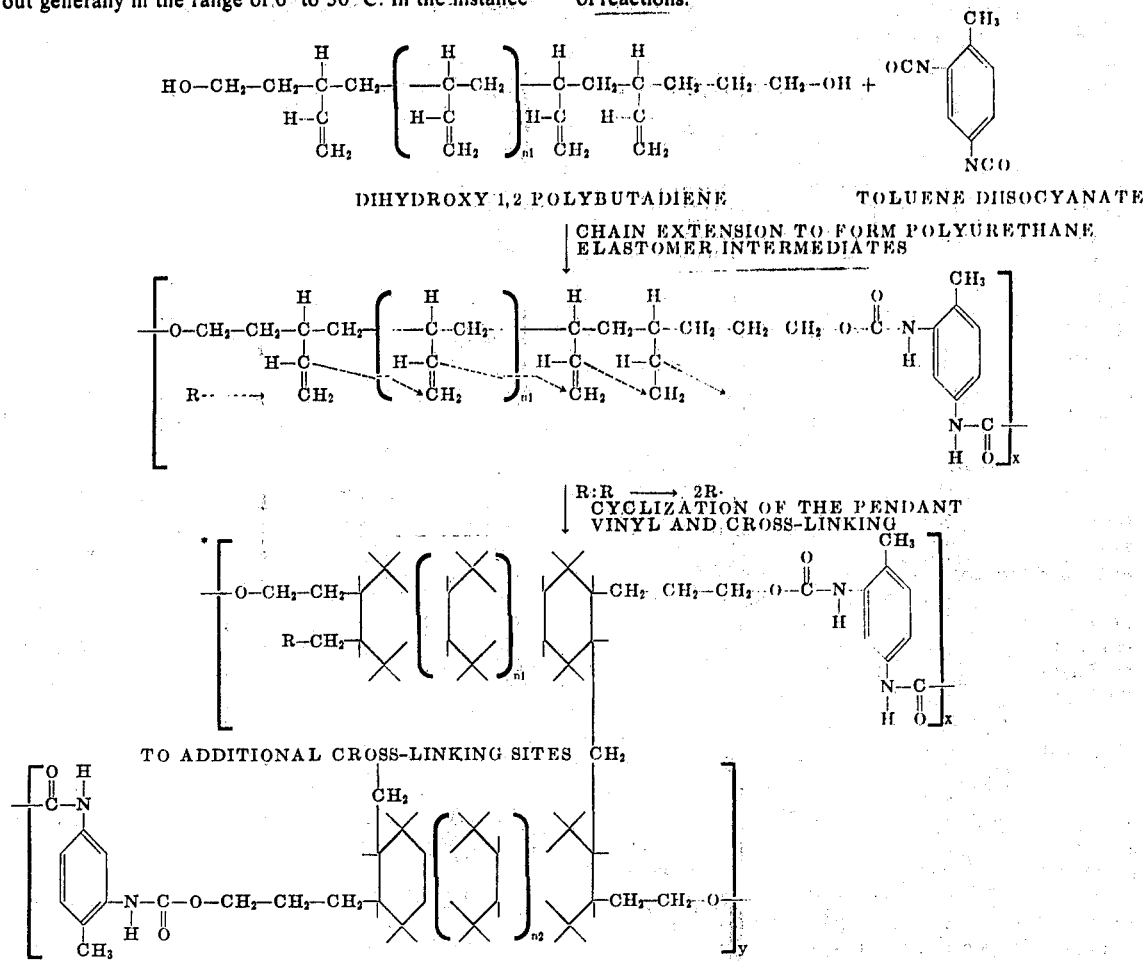

DIHYDROXY 1,2 POLYBUTADIENE    TOLUENE DIISOCYANATE

CHAIN EXTENSION TO FORM POLYURETHANE ELASTOMER INTERMEDIATES

R:R ⟶ 2R·
CYCLIZATION OF THE PENDANT VINYL AND CROSS-LINKING

TO ADDITIONAL CROSS-LINKING SITES

*EACH TICK (—) REPRESENTS A HYDROGEN ATOM

The first reaction polyurethanated between the polybutadienediol and the diisocyanate to form a polyurethanated elastomer intermediate which has molecularly dispersed therein a peroxide free radical initiator. With the application of heat in the second reaction, the peroxide initiator decomposes to provide a free radical R· which promotes cyclization of the pendant vinyl groups of the polydiene and cross-linking of adjacent chains. In the foregoing equations, $n$ typically represents an integer sufficiently high to provide an average molecular weight of about 500 to 3,000 in the prepolymer, R is the residue of the active free radical initiator and $x$ and $y$ are sufficiently high integers to provide a solid, cross-linked product and typically will be in excess of 100.

The polydiene prepolymer and the organic chain extender are preferably reacted in substantially equimolar proportions. However, it will be appreciated that wide deviations from stoichiometry may be employed but generally this will result in a less desirable product. The peroxide free radical initiator is supplied in an amount adequate to promote cyclization of the pendant vinyl groups and cross-linking of adjacent chains. The peroxide is employed generally in an amount within the range of 0.5% to 10% by weight of the polymer and organic chain extender and preferably within the range of 2 to 6%. It will be appreciated that larger and smaller amounts of the peroxide may be employed and that the optimum amount is dependent among other things such as the particular peroxide initiator used, the polydiene prepolymer employed, and the chain extender selected for the reaction.

The cyclized resins of the invention have a high thermal stability in excess of 400° C. and are particularly suitable for high temperature adhesives. This is especially true of the fused, cyclized polybutadiene-urethane polymers which introduce a new chemical system to the art of adhesion. The polydieneurethane resin in curing does not produce a condensation product such as water which would interfere with the formation of a good bone. The latter desirable feature is also characteristic of a reaction between a dicarboxyl substituted polydiene polymer and an organic diimine or a diepoxide chain extender. The cyclized polydiene resins are unique because they are formed stepwise from a fluid prepolymer system to an intermediate tough, tack-free elastomer and finally transformed to tough, stiff, load-bearing adhesive. This stepwise transformation permits the formation of tack-free elastomeric films on the surface of an adherend which may be stored and used subsequently for an adhesive bonding. In contrast, conventional adhesives with comparable high temperature stabilities, such as the polyimides, the polybenzimidazoles, and the polyphenylenes, are extremely difficult to process.

In forming the dihydroxy polydieneurethane resin adhesive bond, the operation may be carried on in two distinct steps or, alternatively, in essentially a single step. In either case, the fluid prepolymer system containing the dihydroxy polydiene prepolymer and the unreacted diisocyanate along with the peroxide free radical initiator is applied to the surface to be bonded. At about room temperature, the fluid prepolymer system will undergo a chain extension of the polydiene material through formation of urethane bonds, as hereinbefore explained, to form a tough, tack-free elastomer having the peroxide initiator uniformly distributed throughout. In the case of the stepwise application, wetting of the substrate with the fluid prepolymer may be facilitated by first dissolving the fluid prepolymer system into suitable resin solvent and thereby obtaining the tough tack-free elastomer having peroxide initiator uniformly distributed throughout subsequent to removal of the solvent carrier through evaporation. The treated surface may be held for long periods of time in this form and subsequently heated when in contact with another surface preferably a similarly treated surface, to obtain the tough, stiff, load-bearing adhesive bond. Alternatively, the fluid prepolymer system may be placed between the surfaces of the two adherends and a minimal amount of pressure applied and the system heated through a curing cycle from room temperature to 130° C.

The resin of the invention is particularly suitable for the formation of coatings on pipes, containers, and other materials exposed to high temperatures and corrosive chemicals. The coating will prevent attack by water and protect against weathering of surfaces and may be applied to wood, metal, ceramic, plastic, and fabric structures. The coating can be applied to the surface being protected either in the form of the neat resin or in a suitable resin solvent. This class of resins has advantages over conventional protective plastic coatings because of the very good chemical resistance even to compounds such as nitrogen tetroxide, nitric acid, concentrated sulfuric acid, sodium hydroxide solution, acetic acid, halogenated hydrocarbons, acetone, and hydrocarbon solvents. The coating may be applied in the form of a spray (aerosol), paint, or dip, either in a carrier or in the neat liquid uncured form. The protective coating is nearly colorless and consequently pigments or dyes may be formulated into the mixture to provide desirable colors.

In a typical protective coating composition, a diisocyanate material and an organic peroxide are dispersed in a prepolymer liquid comprising a dihydroxypolybutadiene composition. A suitable diisocyanate material is 2,4-toluene diisocyanate and a suitable peroxide free radical initiator is ditertiary butyl peroxide. The foregoing mixture can be prepared in the presence or absence of a carrier solvent. An example of a good carrier solvent for the foregoing composition is cyclohexane. It will be appreciated that there are available many other volatile solvents which can serve adequately as a carrier solvent. The ingredients are mixed with the solvent in desirable proportions depending on final coating properties desired, e.g., hardness and other mechanical properties, adhesion to the surface, degree of chemical resistance and relative volatility of the carrier solvent, desired set time, etc. The coating composition is applied to the surface being treated either in the form of paint, spray (aerosol), or dip. If a carrier is used such as cyclohexane, the carrier is removed through evaporation, which can be promoted by heating, evacuation, or blowing an inert gas over the surface. The resin is then cured on the surface to a stiff, hard substance at temperatures around 120° C.

According to the teaching of this invention, the aforementioned coating may be formed uniformly in predetermined thickness on the surface of the substrate. The formation of the rubbery composition at room temperature allows the heating of the coating at elevated temperatures without running or distorting the resin. Without formation of the first step urethane reaction, heating the coating to elevated temperatures would lower the viscosity of the coating and permit flowing, and hence, result in a nonuniform product.

It will be appreciated that in addition to the example of the cyclized polybutadiene tolyl urethanes, other resin systems are available for coating compositions. Satisfactory protective coatings can be obtained utilizing any diol having pendant vinyl groups on alternating backbone carbon atoms, e.g., 3,4-polyisoprenediol. In addition to the respective coatings containing the polyurethane groups, chain extension of the dihydroxy polydiene prepolymer may be obtained with ester linkages, e.g., from a reaction with a dibasic acid, dianhydride, or a diacid chloride. It will be appreciated that analogous compounds can also be utilized which consist of 1,2-polybutadiene or 3,4-polyisoprene structures that have terminal amine groups which could be reacted with a diisocyanate chain extender to form a substituted polyurea or with a dibasic acid anhydride or a diacid chloride to form the polyamide chain extension links.

An aqueous protective coating composition can be prepared utilizing a dicarboxypolydiene prepolymer and an organic diepoxide chain extender such as 3,4-epoxy-6-methylcyclohexylmethyl-3,4-epoxy- 6-methylcyclohexane carboxylate.

The resin systems of the invention may be used as matrices for reinforced structures prepared by using conventional processing techniques. The reinforced structures may contain glass, carbon, graphite, or other reinforcing fabrics or metals.

Structural plastics prepared from this class of compounds shown promise for use in deep submergence ocean vessels, lightweight structural plastics, and ablative materials. The composite reinforced structure may be prepared, for example, through vacumm-bag lay-up methods, preimpregnation and molding, tape-winding and curing, or by filament winding procedures.

The resin system may be applied to a reinforcement material with a carrier solvent which, on drying, will leave an impregnated reinforcement material. This impregnated material may be subsequently pressed to form a solid, coherent structural material at moderate temperatures under low applied mechanical pressures. In using the preimpregnation technique the carrier solvent is readily removed through simple air-drying techniques. If vacuum-bag lay-up or filament-wound methods are used, it is preferable not to employ a carrier solvent. The product is cured desirably in an oxygen free environment at moderate temperatures and at moderate applied pressures. Maximum mechanical properties of the reinforced plastic have been obtained where the reinforcing material has free vinyl groups on its surface which can participate directly in the cyclization and cross-linking reactions during cure. A particular example of the latter is the use of a vinyl silane finish on glass reinforcement materials.

The reinforced structural plastic of the invention has a lower density than presently available structures using conventional resin matrices at the same weight percent loading of ingredients. The mechanical properties of the reinforced structural plastic are not degraded appreciably on boiling in water.

The following examples are presented to illustrate the various features of the invention and are not intended to be limiting.

EXAMPLE I

Six hundred parts of a 1,2-polybutadienediol having an average molecular weight of 2,000, and 12 parts of ditertiary butyl peroxide are placed in a glass vessel and mixed thoroughly. Sixty parts of toluene diisocyanate are then added to the vessel and the solution stirred until it becomes homogeneous. The solution is degassed in a vacuum chamber at an applied vacuum of about 1 millimeter of mercury for approximately 15 minutes. At the end of the degassing period, the material is poured into a mold and cured consecutively under the following sets of conditions: (1) 10 days at 90° C. in air (2) 6 days at 110° C. in air (3) 8 days at 115° C. in air (4) 15 days at 170° C. in vacuum. The cured resins are clear, transparent, hard, and light yellow in color. A typical casting has the following physical properties:

Tensile strength: 5,500 p.s.i.
Hardness: Barcol No. Of 40
Compressive strength: 38,400 p.s.i.
Compressive modulus: 225,000 p.s.i.
Density: 1.04 g./ml.
Specific heat: 0.34 cal./°C/g.
Thermal conductivity: $7.54 \times 10^{14}$ cal./cm.$^2$/sec./
Decomposition temperature: 457° C. (in $N_2$)
Weight loss in air at 300°C: 0.079%/hr.
Dielectric strength: 1,800 volts/mil

EXAMPLE II

Twenty parts of a 1,2-polybutadienediol having an average molecular weight of 2,000 and 0.40 parts of di-tertiary butyl peroxide is placed in a glass vessel and mixed thoroughly. Toluene diisocyanate is added in an amount of 1.88 parts and the solution stirred until homogeneous. Degassing and curing are carried out as in Example I. A light yellow, transparent plastic is obtained having a Barcol hardness of 35 to 45.

EXAMPLE III

Twenty parts of a 1,2-polybutadienediol having an average molecular weight of 2, and 0.40 parts of di-tertiary butyl peroxide are placed in a glass vessel and thoroughly mixed. Hexamethylene diisocyanate is added in an amount of 1.60 parts and the solution stirred until homogeneous. Degassing and curing are carried out as in Example I. A light yellow, transparent plastic is produced having a Barcol hardness of 43, a specific heat of 0.365 cal./°C./g., and decomposition temperature in nitrogen of 457° C.

EXAMPLE IV

Twenty parts of a 1,2-polybutadienediol having an average molecular weight of 2000 and 0.40 parts of di-tertiary butyl peroxide is placed in a glass vessel and mixed thoroughly. Bitolylene diisocyanate is added in an amount of 2.90 parts and the material is gently warmed and stirred until the diisocyanate is placed into solution. Degassing and curing is carried out as in Example I. A material similar to that described in Example I is obtained, having a Barcol number of 34, a specific heat of 0.346, and a decomposition temperature in nitrogen of 456° C.

EXAMPLE V

Ten parts of a 1,2-polybutadienediol having a molecular weight of approximately 2,000 is mixed with 0.2 parts of 2,5-methyl-2,5-di(tertiary butyl peroxy) hexane in a glass vessel. To this solution is added 1.0 part of toluene diisocyanate and the materials are mixed until homogeneous. The resin mixture is processed as set forth in Example I to give a clear, transparent light yellow plastic with a Barcol hardness number of 42.

EXAMPLE VI

Ten parts of a 1,2-polybutadienediol having a molecular weight of approximately 2,000 are mixed with 0.2 parts of tertiary butyl perbenzoate in a glass vessel. To this solution is added 1.0 part toluene diisocyanate and the materials mixed until homogeneous. The resin mixture is then processed as specified in Example I to obtain a clear, transparent light yellow plastic with a Barcol hardness number of 30.

EXAMPLE VII

Thirty parts of a 1,2-polybutadienediol having an approximate molecular weight of 2,000 are mixed with 0.6 parts dicumyl peroxide in a glass vessel. Toluene diisocyanate is added to the above mixture in an amount of 3.0 parts. The materials are mixed in the glass vessel until a homogeneous solution results, and the solution is processed as specified in Example I to give a brown, translucent plastic having a Barcol hardness number of 25.

EXAMPLE VIII

One hundred thirty-five parts of 3,4-polyisoprene glycol having an average molecular weight of 1,350 and 2.7 parts of di-t-butyl peroxide are placed in a glass vessel and mixed thoroughly. Toluene diisocyanate is added in the amount of 18.8 parts and the solution stirred until homogeneous. The solution is degassed in a vacuum chamber at a pressure of about 1 mm. hg. for approximately 5 minutes. At the end of the degassing period, the material is poured into a mold and cured consecutively under these sets of conditions: (1) 8 days at 90° C. in air, (2) 10 days at 115° C. in air, and (3) 10 days at 170° C. in vacuum. The cured resins are clear, transparent, hard and yellow in color.

EXAMPLE IX

Twenty parts of a 1,2-polybutadienediol having an average molecular weight of 2,000 and 0.00002 parts triethylendiamine are placed in a glass vessel and thoroughly mixed. The mixture is heated to 100° C. and stirred until the triethylenediamine dissolves in the prepolymer. The vessel is cooled to room temperature and 0.40 parts di-t-butyl peroxide is mixed into the solution. Toluene diisocyanate is added in the amount of 1.88 parts and the solution is stirred until homogeneous. The solution is transferred to a mold, placed in a vacuum chamber, and degassed at a pressure of about 1 mm. hg. for approximately 3 minutes. The degassed material is cured consecutively under these sets of conditions: (1) 2 days at 90° in air, (2) 10 days at 115° C. in air, and (3) 5 days at 170° C. in vacuum. The cured resins are clear, transparent, hard, and yellow in color.

EXAMPLE X

Twenty parts of a 1,2-polybutadienediol having an average molecular weight of 2,000 and 0.00002 parts anhydrous p-toluene sulfonic acid are placed in a glass vessel and thoroughly mixed. The mixture is heated to 110° C. and stirred until homogeneous. The vessel is cooled to room temperature and 0.40 parts di-t-butyl peroxide is mixed into the solution. Toluene diisocyanate is added in the amount of 1.88 parts and the solution is stirred until homogeneous. The solution is transferred to a mold, placed in a vacuum chamber, and degassed at a pressure of about 1 mm. hg. for approximately 3 minutes. The degassed material is cured consecutively under these sets of conditions: (1) 2 days at 90° C. in air, (2) 10 days at 115° C. in air, and (3) 5 days at 170° C. in vacuum. The cured resins are clear, transparent, hard, and yellow in color.

EXAMPLE XI

Twenty parts of a 1,2-polybutadienediol having an average molecular weight of 2,000 and 0.00002 parts ferric acetylacetonate are placed in a glass vessel and thoroughly mixed. To this mixture are added 0.4 parts di-t-butyl peroxide and 1.88 parts toluene diisocyanate; the mixture is stirred until homogeneous. The material is transferred to a mold, placed in a vacuum chamber, and degassed at a pressure of about 1 mm. hg. for approximately 3 minutes. The degassed material is cured consecutively under these sets of conditions: (1) 2 days at 90° C. in air, (2) 10 days at 115° C. in air, and (3) 5 days at 170° C. in vacuum. The cured resins are clear, transparent, hard, and brown in color.

EXAMPLE XII

One hundred parts of a 1,2-polybutadienediol having an average molecular weight of 2,000 and 2 parts of di-t-butyl peroxide are placed in a glass vessel and thoroughly mixed. Polymethylene polyphenylisocyanate is added in the amount of 14.6 parts and the solution is stirred until homogeneous. The solution is degassed in a vacuum chamber at a pressure of about 1mm. hg. for approximately 5 minutes. At the end of the degassing period, the material is poured into a mold and cured consecutively under these sets of conditions: (1) 7 days at 90° C. in air, (2) 10 days at 115° C. in air, and (3) 6 days at 170° in vacuum. The cured resins are clear, transparent, hard, 5 yellow in color.

EXAMPLE XIII

Twenty parts of a 1,2-polybutadienediol having an average molecular weight of 2,000, and 0.8 parts of di-t-butyl peroxide are placed in a glass vessel and thoroughly mixed. Toluene diisocyanate is added in the amount of 1.88 parts and the solution is mixed thoroughly. Twenty parts of cyclohexane are blended into the solution. The solution is brushed onto 1× 2 piece of titanium sheet metal and a similarly sized piece of stainless steel 303 and then the pieces are hung to dry for 48 hours in air. After the drying period, the coated pieces are clamped together and cured consecutively under these sets of conditions: (1) 1 hour at 90° C. (2) 2 hours at 115° C. and (3) 3 hours at 170° C. The tensile strength of the bond is greater than 1,000 p.s.i.

EXAMPLE XIV

Twenty parts of 1,2-polybutadienediol having an average molecular weight of 2,000 and 0.8 parts of di-t-butyl peroxide are placed in a glass vessel and thoroughly mixed. Toluene diisocyanate is added in the amount of 1.88 parts and the solution is mixed thoroughly. Twenty parts of cyclohexane are blended into the solution. The solution is applied to two 1×2 pieces of titanium sheet metal by dipping the metal into the solution. The sheets are hung to dry for 48 hours in air. After the drying period, the coated pieces are clamped together and cured consecutively under these sets of conditions: (1) 1 hour at 90° C. (2) 2 hours 115° C., and (3) 3 hours at 170° C. The average tensile strength of the bond is greater than 1,000 p.s.i.

EXAMPLE XV

Thirty parts of a 1,2-polybutadienediol having an average molecular weight of 600, and 0.6 parts of di-t-butyl peroxide are placed in a glass vessel and thoroughly mixed. Toluene diisocyanate is added in the amount of 9.4 parts and the solution is mixed until homogeneous. The solution is applied to two 1× 2 pieces of titanium sheet metal by dipping the metal into solution. The sheets are hung to dry for 48 hours in air. After the drying period, the coated pieces are clamped together and cured consecutively under these sets of conditions: (1) 1 hour at 90° C., (2) 2 hours at 115° C., and (3) 3 hours at 170° C. A good adhesive bond results.

EXAMPLE XVI

One hundred parts of a 1,2-polybutadienediol having an average molecular weight of 2,000 and 8.0 parts of di-t-butyl peroxide are placed in a glass vessel and mixed thoroughly. Toluene diisocyanate is added in the amount of 9.4 parts and the solution is stirred until homogeneous. The solution is degassed at 90° C. in a vacuum chamber at an applied vacuum of about 1 mm. hg. for approximately 5 minutes. At the end of the degassing period, clean aluminum sheets (1× 2× 1/16) are dipped once into the resin and dried for 8 hours at room temperature in air. The resin coated aluminum is then cured for 5 hours at 170° C. in air. The finished coatings are clear, transparent, hard, and have a slight yellow color tinge.

EXAMPLE XVII

Twenty parts of a 1,2-polybutadienediol having an average molecular weight of 2,000 and 0.80 parts of di-t-butyl peroxide are placed in a glass vessel and thoroughly mixed. Toluene diisocyanate is added in the amount of 1.88 parts and the solution is mixed well. Twenty parts of cyclohexane are blended into the solution and the solution poured into a pan. A 6× 14 piece of silica cloth (99% $SiO_2$), previoulsy dried for 2 hours at 170° C., is slowly passed once through the resin solution. The cloth is air-dried for 3 days at room temperature. Fifty 1-inch diameter discs are cut from the impregnated cloth and the discs are placed in a mold. The discs are cured for 2 hours at 90° C., followed by 3 hours at 170° C. while maintaining a pressure of 2,500 p.s.i. on the mold. At the end of the curing cycle, a solid laminated plug is removed from the mold.

A crack-free, void-free, cream colored laminate is obtained. The material has a resin content of 34.4% and a Barcol hardness of 50 to 60.

EXAMPLE XVIII

Twenty parts of a 1,2-polybutadienediol having an average molecular weight of 2,000 and 0.80 parts of di-t-butyl peroxide are placed in a glass vessel and thoroughly mixed. Toluene diisocyanate is added in the amount of 1.88 parts and the solution is mixed. Twenty parts of cyclohexane are blended into the solution and the solution poured into a pan. A 6× 14 piece of carbon cloth, previously dried for 2 hours at 170° C., is slowly passed once through the resin solution. The cloth is air-dried for 3 days at room temperature. About 50 discs of 1-inch diameter are cut from the impregnated cloth and the discs stacked in a mold. The discs are cured for 2 hours at 90° C., followed by 3 hours at 170° C. while maintaining a pressure of 2,500 p.s.i. on the mold. At the end of the curing cycle, a solid laminated plug is removed from the mold. A crack-free, void-free, black colored laminate is obtained. The material has a Barcol hardness of 50 to 60

EXAMPLE XIX

Two hundred and fifty parts by weight of a 1,2-polybutadienediol having an average molecular weight of 2,000, and 0.025 parts triethylenediamine (a chain-extending catalyst) are placed in a glass vessel and gently warmed until the triethylenediamine dissolves into the resin. The solution is cooled to room temperature and 20 parts di-t-butyl peroxide mixed into the solution. Toluene diiocyanate is added in the amount of 23.5 parts, followed by the addition of 300 parts cyclohexane. The ingredients are mixed until homogeneous and then poured into a shallow pan. Four 6×14 pieces of silica cloth (99% SiO$_2$), previously dried for 1 hour at 120° C., are each passed through the solution and air dried at room temperature for 3 days. Fifty 2½-inch diameter discs are cut from the cloth and the discs are placed in a mold. The discs are subjected to 2,500 p.s.i. and cured consecutively under these sets of conditions: (1) 4 hours at 90° C., (2) 2 hours at 115° C., (3) 16 hours at 130° C., and (4) 24 hours at 150° C. The mold is allowed to cool to room temperature before releasing the pressure and removing the laminate. A light yellow laminate is obtained that was free of cracks and voids and has the following physical properties.
 a. Barcol hardness of 50 to 60
 b. Density of 1.55 gm./cc.
 c. Resin content of 32.8% w/w.

EXAMPLE XX

One hundred parts (100) of a 1,2-polybutadienediol having an average molecular weight of 2,000 and 2 parts di-t-butyl peroxide are placed in a glass vessel and thoroughly mixed. Ten parts of sebacic acid are dissolved in 100 parts acetone and added to the glass vessel. The contents of the vessel are mixed thoroughly and poured into a pan. A 6×14 piece of silica cloth (99% SiO$_2$), previously dried for 2 hours at 115° C., is slowly passed through the resin solution 2 times. The impregnated cloth is cured 2 days at 80° C. in a nitrogen atmosphere. Fifty 1-inch diameter discs are cut from the cloth and the discs are placed in a mold. The discs are subjected to 2500 p.s.i. and cured consecutively under these sets of conditions: (1) 16 hours at 115° C., (2) 16 hours at 130° C., and (3) 16 hours at 150° C. At the end of the curing cycle, a solid plug is removed from the mold. A hard laminate, free of cracks and voids is obtained.

EXAMPLE XXI

One hundred parts of a 1,2-polybutadienediol having an average molecular weight of 2,000 and 2 parts di-t-butyl peroxide are placed in a glass vessel and thorough mixed. 100 parts of anhydrous benzene are added and mixed into the solution. Dodecenylsuccinyl chloride is added in the amount of 34.7 parts and the material is gently heated and stirred until homogeneous. The contents of the vessel are poured into a shallow pan. A 6×14 piece of silica cloth (99% SiO$_2$), previously dried for 2 hours at 115° C., is slowly passed through the resin 2 times. The impregnated cloth is cured 2 days at 80° C. in a nitrogen atmosphere. 50 1-inch diameter discs are cut from the cloth and the discs are placed in a mold. The discs are subjected to 2,500 p.s.i. and cured consecutively under these sets of conditions: (1) 16 hours at 115° C. (2) 16 hours at 130° C., and (3) 16 hours at 150° C. At the end of the curing cycle, a solid plug is removed from the mold. A hard laminate, free from cracks and voids, is obtained.

EXAMPLE XXII 100 parts of a 1,2-polybutadienediol having an average molecular weight of 2,000 and 4 parts of di-t-butyl peroxide are placed in a glass vessel and thoroughly mixed. 5 parts of succinic anhydride are dissolved in 100 parts carbontetrachloride and added to the glass vessel. The contents of the vessel are mixed thoroughly and poured into a pan. A 6×14 piece of silica cloth (99% SiO$_2$), previously dried for 2 hours at 115° C., is slowly passed 2 times through the resin solution. The impregnated cloth is cured 2 days at 80° C. in a nitrogen atmosphere. 50 1-inch diameter discs are cut from the cloth and the discs are placed in a mold. The discs are subjected to 2,500 p.s.i. and cured consecutively under these sets of conditions: (1) 16 hours at 115° C., (2) 16 hours at 130° C., and (3) 16 hours at 150° C. At the end of the curing cycle, a solid plug is removed from the mold. A hard laminate, free of cracks and voids, is obtained.

EXAMPLE XXIII

One hundred (100) parts of a 1,2-polybutadienediol having an average molecular weight of 2,000 and 2 parts of di-t-butyl peroxide are placed in a glass vessel and mixed thoroughly. 3,3', 4,4'-benzophenone tetracarboxylic dianhydride is added in the amount of 17.4 parts and the solution stirred until homogeneous. The solution is degassed in a vacuum chamber at an applied vacuum of about 1 mm. hg. for approximately 5 minutes. At the end of the degassing period, the material is poured into a mold and cured consecutively under these sets of conditions: (1) 6 days at 90° C. in air, (2) 5 days at 115° C. in air, and (3) 5 days at 150° C. in air. The cured resin is hard, tough and dimensionally stable.

EXAMPLE XXIV

One hundred (100) parts of a 1,2-polybutadienediol having an average molecular weight of 2,000 and 2 parts of di-t-butyl peroxide are placed in a glass vessel and mixed thoroughly. Pyromellitic dianhydride is added in the amount of 13.6 parts and the solution stirred until homogeneous. The solution is degassed in a vacuum chamber at an applied vacuum of about 1 mm. hg. for approximately 10 minutes. At the end of the degassing period, the material is poured into a mold and cured consecutively under these sets of conditions: (1) 6 days at 90° C. in air, (2) 5 days at 115° C. in air, and (3) 5 days at 250° C. in air. The cured resin is hard, tough, and dimensionally stable.

EXAMPLE XXV

One hundred (100) parts of a carboxylic acid terminated 1,2-polybutadiene having an average molecular weight of 2,000 and two parts di-t-butyl peroxide are placed in a glass vessel and mixed thoroughly. 3,4-epoxy-6-methylcyclohexylmethy-6-methylcyclohexanecarboylate is added in the amount of 15.1 parts and stirred until homogeneous and the solution is degassed in a vacuum chamber at an applied vacuum of about 1 mm. hg. for approximately 5 minutes. At the end of the degassing period, the material is poured into a mold and cured consecutively under these sets of conditions: (1) 4 days at 90° C. in air, (2) 5 days at 115° C. in air and (3) 5 days at 150° C. in air. The cured resin is hard, tough, and dimensionally stable.

EXAMPLE XXVI

One hundred parts of a carboxy terminated 1,2-polybutadiene having an average molecular weight of 2,000, and two parts di-t-butyl peroxide are placed in a glass vessel and mixed thoroughly. Nine and one-quarter parts 1,6-hexane-N,N' -diethylenimine are quickly mixed into the vessel and the solution is stirred until homogeneous. The solution is degassed in a vacuum chamber at a pressure of about 1mm. hg. for approximately 5 minutes. At the end of the degassing period, the material is poured into a mold and cured consecutively under these sets of conditions: (1) 1 day of 60° C. in air, (2) 5 days at 115° C. in air, and (3) 5 days at 150° C. in air. The cured resin is hard, tough, and dimensionally stable.

EXAMPLE XXVII

One hundred (100) parts of amine terminated 1,2-polybutadienediol having an average molecular weight of 2,000 and 2 parts di-t-butyl peroxide are placed in a glass vessel and mixed thoroughly. Toluene diisocyanate is added in the amount of 9.4 parts and the solution stirred until homogeneous. The solution is degassed in a vacuum chamber at an applied vacuum of about 1 mm. hg. for approximately 5 minutes. At the end of the degassing period, the material is poured into a mold and cured consecutively under these sets of conditions: (1) 6 days at 50° C. in air, (2) 5days at 115° C. in air, and (3) 5 days at 150° C. in air. The cured resin is hard, tough and dimensionally stable.

EXAMPLE XXVIII

One hundred (100) parts of an amine terminated 1,2-polybutadiene having an average molecular weight of 2,000 and 2 parts of di-t-butyl peroxide are placed in a glass vessel and mixed thoroughly. 3,3',4,4'-benzophenonetetracarboxylic dianhydride is added in the amount of 17.4 parts and the solution is degassed in a vacuum chamber at an applied vacuum of about 1 mm. hg. for approximately 10 minutes. At the end of the degassing period, the material is poured into a mold and cured consecutively under these sets of conditions: (1) 3 days at 70° C. in air, (2) 5 days at 115° C. in air and (3) 5 days at 150° C. in air. The cured resin is hard, tough, and dimensionally stable.

The new resins are thermally stable at temperatures of 400° C., they are tough, resistant to impact and exhibit a high modulus of elasticity. The thermally stable, "stiff" character of the new materials is attributed to the fused cyclic configuration of the polymer chain between chemical cross-links. In contrast, cross-linked polyolefins are characterized by "flexible", single, chemical bonds between cross-links, thus yielding materials which are thermally less stable and dimensionally less stiff than the cyclized materials. The toughness and impact resistance properties of the new resins are attributed to the chain extension of the prepolymer to form high molecular weight polymers through polyurethane bonds which occur upon reaction of the prepolymer with the diisocyanate. All of these advantages are achieved at a relatively high hydrocarbon content.

We claim:

1. A structure comprising a plurality of adherends held in engagement by a hard thermoset adhesive resin comprising the reaction product of
a polydiene having (1) polyfunctional groups selected from the group consisting of hydroxyl, carboxyl, and amino and (2) a predominant amount of vinyl groups on alternate carbon atoms of the polydiene backbone, (3) an organic chain extender capable of reacting with the functional groups of the polydiene, and (4) a peroxide free radical initiator.

2. A structure according to claim 1 wherein the polydiene is selected from the group consisting of 1,2-polybutadiene and 3,4-polyisorprene.

2. A structure according to claim 1 wherein the chain extender capable of reacting with the hydroxyl functional groups on the polydiene is selected from the group consisting of (a) diisocyante substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

4. A structure according to claim 1 wherein the chain extender capable of reacting with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

5. A structure according to claim 1 wherein the chain extender capable of reacting with the amino functional groups on the polydiene is selected from the group consisting of (a) diisocyanate substituted aliphatic compounds, (b)diisocyanate substituted aromatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

6. A process of bonding a plurality of adherends together comprising:
A. forming an adhering elastomeric coating on at least one surface of said adherends, said elastomeric coating comprising the reaction product of (1) a polydiene having (i) polyfunctional groups selected from the group consisting of hydroxyl, carboxyl, and amino and (ii) a predominant amount of vinyl groups on alternate carbon atoms of the polydiene backbone and (2) an organic chain extender capable of reacting with the functional groups of the polydiene, said elastomer being characterized further in having a peroxide free radical initiator dispersed therethrough substantially unreacted,
B. bring the adherends into engagement with the rubber coating therebetween; and
C. curing to produce a tenacious bond of hard thermoset resin.

7. A process according to claim 6 wherein the polydiene is selected from the group consisting of 1,2-polybutadiene and 3,4-polyisoprene.

8. A process according to claim 6 wherein the chain extender capable of reacting with the hydroxyl functional groups on the polydiene is selected from the group consisting of (a) diisocyante substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

9. A process according to claim 6 wherein the chain extender capable of reacting with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

10. A process according to claim 6 wherein the chain extender capable of reacting with the amino functional groups on the polydiene is selected from the group consisting of (a) diisocyanate substituted aliphatic compounds, (b) diisocyanate substituted aromatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

11. A process of forming a protective coating on a surface comprising:
   A. applying a liquid composition to said surface, said liquid composition comprising (1) a polydiene having (i) polyfunctional groups selected from the group consisting of hydroxyl, carboxyl, and amino and (ii) a predominant amount of vinyl groups on alternate carbon atoms of the polydiene backbone, (2) an organic chain extender capable of reacting with the functional groups of the polydiene, and (3) a peroxide free radical initiator and
   B. reacting said liquid composition to form an elastomeric coating having the peroxide dispersed therethrough substantially unreacted and (c) curing said elastic coating to form a hard thermoset resinous coating.

12. A process according to claim 11 wherein the polydiene is selected from the group consisting of 1,2-polybutadiene and 3,4-polyisoprene.

13. A process according to claim 11 wherein the chain extender capable of reacting with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

14. A process according to claim 11 wherein the chain extender capable of reacting with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

15. A process according to claim 11 wherein the chain extender capable of reacting with the amino functional groups on the polydiene selected from the group consisting of (a) diisocyanate substituted aliphatic compounds, (b) diisocyanate substituted aromatic compounds, (c) anhydride substituted aliphatic compounds, (d) anhydride substituted aromatic compounds, (e) dianhydride substitutes aliphatic compounds, (f) dianhydride substitutes aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

16. A coated article comprising:
   A. a coating of the reaction product of (1) a polydiene having (i) polyfunctional groups selected from the group consisting of hydroxyl, carboxyl, and amino and (ii) a predominant amount of vinyl groups on alternate carbon atoms of the polydiene backbone, (2) an organic chain (d) capable of reacting with the functional groups of the polydiene, and (3) a peroxide free radical initiator, and
   B. a substrate selected from the group consisting of wood, metal, plastic, ceramic and fabric.

17. An article according to claim 26 wherein the polydiene is selected from the group consisting of 1,3,-polybutodiene and 3,4-polyisoprene.

18. An article according to claim 28 wherein the chain extender capable of reacting with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

19. An article according to claim 16 wherein the chain extender capable of reacting with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

20. An article according to claim 16 wherein the chain extender capable of reacting with the amino functional groups on the polydiene is selected from the group consisting of (a) diisocyanate substituted aliphatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarbioxylic acid substituted aromatic compounds, (i) diacid halide substituted aliphatic compounds, (j) diacid halide substituted aromatic compounds, (k) diester substituted aliphatic compounds, (1) diester substituted aromatic compounds, (m) diepoxide substituted aliphatic compounds, and (n) diepoxide substituted aromatic compounds.

* * * * *